(12) United States Patent
Yang et al.

(10) Patent No.: US 11,145,937 B2
(45) Date of Patent: Oct. 12, 2021

(54) BATTERY PACK

(71) Applicant: Samsung SDI Co., Ltd., Yongin-si (KR)

(72) Inventors: Seungwoo Yang, Yongin-si (KR); Eungyeong Gu, Yongin-si (KR); Junyoung Kim, Yongin-si (KR); Kyungho Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 128 days.

(21) Appl. No.: 16/358,357

(22) Filed: Mar. 19, 2019

(65) Prior Publication Data

US 2019/0296309 A1 Sep. 26, 2019

(30) Foreign Application Priority Data

Mar. 20, 2018 (KR) .................. 10-2018-0032340

(51) Int. Cl.
*H01M 50/20* (2021.01)
*H01M 50/502* (2021.01)
*H01M 50/543* (2021.01)

(52) U.S. Cl.
CPC ......... *H01M 50/502* (2021.01); *H01M 50/20* (2021.01); *H01M 50/543* (2021.01)

(58) Field of Classification Search
CPC ............ H01M 2/02; H01M 2/10; H01M 2/20; H01M 2/30
See application file for complete search history.

(56) References Cited

U.S. PATENT DOCUMENTS

| 8,580,423 | B2 | 11/2013 | Kim |
| 8,801,444 | B2 | 8/2014 | Sakae et al. |
| 9,525,228 | B2 | 12/2016 | Oda et al. |
| 9,774,023 | B2 | 9/2017 | Park et al. |
| 2002/0039283 | A1 | 4/2002 | Nakamura et al. |

(Continued)

FOREIGN PATENT DOCUMENTS

| CN | 102044693 A | 5/2011 |
| CN | 104466076 A | 3/2015 |

(Continued)

OTHER PUBLICATIONS

Machine Translation of: Yamauchi (WO 2013/065523 A1), May 10, 2013.*

(Continued)

*Primary Examiner* — Kenneth J Douyette
(74) *Attorney, Agent, or Firm* — Lewis Roca Rothgerber Christie LLP (57) ABSTRACT

A battery pack includes a series of battery cells, a series of bus bars electrically connecting the series of battery cells, and a terminal member. The terminal member includes a first metal layer extending from an internal connection position connected to at least one of the series of bus bars to an external connection position for supplying output power of the battery pack. The terminal member also includes a second metal layer covering the first metal layer at the external connection position. The second metal layer includes a second metal different from a first metal of the first metal layer. Therefore, the battery pack has an improved structure for stable and low-resistance connection.

23 Claims, 6 Drawing Sheets

(56) References Cited

U.S. PATENT DOCUMENTS

| | | | |
|---|---|---|---|
| 2006/0228620 A1* | 10/2006 | Martinson | H01M 2/263 429/56 |
| 2011/0293994 A1 | 12/2011 | Casoli | |
| 2012/0009461 A1 | 1/2012 | Kim et al. | |
| 2013/0323574 A1* | 12/2013 | Tsunaki | H01M 2/30 429/158 |
| 2016/0126526 A1 | 5/2016 | Yang et al. | |
| 2016/0351881 A1 | 12/2016 | Lee | |
| 2017/0054132 A1 | 2/2017 | Ma et al. | |
| 2017/0098814 A1 | 4/2017 | Golubkov | |

FOREIGN PATENT DOCUMENTS

| | | |
|---|---|---|
| EP | 2 579 357 A1 | 4/2013 |
| JP | 2011-210480 A | 10/2011 |
| JP | 2012-018904 A | 1/2012 |
| JP | 2014-235870 A | 12/2014 |
| JP | 5958841 B2 | 8/2016 |
| KR | 10-2008-0057780 A | 6/2008 |
| KR | 10-0993668 B1 | 11/2010 |
| KR | 10-1273193 B1 | 6/2013 |
| KR | 10-2014-0064093 A | 5/2014 |
| KR | 10-2014-0136869 A | 12/2014 |
| KR | 10-1623717 B1 | 5/2016 |
| KR | 10-2017-0021058 A | 2/2017 |
| KR | 10-2017-0041131 A | 4/2017 |
| WO | WO 2013/065523 A1 | 5/2013 |

OTHER PUBLICATIONS

EPO Office Action dated May 14, 2020, for corresponding European Patent Application No. 19164120.8 (3 pages).

Extended European Search Report for corresponding European Patent Application No. 19164120.8, dated May 27, 2019, 64 pages.

Korean Office action for Application No. 10-2018-0032340, dated Jun. 30, 2021, 4 pages.

Chinese Office action for Application No. 201910207339.1, dated Jul. 27, 2021, 15 pages.

* cited by examiner

BATTERY PACK

CROSS-REFERENCE TO RELATED APPLICATION

This application claims priority to and the benefit of Korean Patent Application No. 10-2018-0032340, filed on Mar. 20, 2018, in the Korean Intellectual Property Office, the disclosure of which is incorporated herein in its entirety by reference.

BACKGROUND

1. Field

One or more embodiments relate to a battery pack.

2. Description of the Related Art

In general, secondary batteries are rechargeable unlike non-rechargeable primary batteries. Secondary batteries are used as energy sources of devices such as mobile devices, electric vehicles, hybrid vehicles, electric bicycles, or uninterruptible power supplies. Secondary batteries may be used individually or the secondary batteries may be connected together as secondary battery modules (packs) depending on the types of external devices using the secondary batteries and the power requirements thereof.

Unlike small mobile devices such as cellular phones each operable for a certain period of time using a single battery, devices such as electric vehicles or hybrid vehicles having long operation times and consuming large amounts of electricity may utilize battery modules (packs) each including a series of batteries (battery cells) to handle problems relating to power and capacity, and the output voltages or currents of battery modules may be increased by adjusting the number of batteries included in each battery module.

SUMMARY

One or more embodiments include a battery pack having an improved structure for stably connecting a series of battery cells with low electrical resistance.

Additional aspects will be set forth in part in the description which follows and, in part, will be apparent from the description, or may be learned by practice of the presented embodiments.

According to one or more embodiments, a battery pack includes a series of battery cells, a series of bus bars electrically connecting the series of battery cells, and a terminal member. The terminal member includes a first metal layer extending from an internal connection position connected to at least one of the series of bus bars to an external connection position for supplying output power of the battery pack, and a second metal layer covering the first metal layer at the external connection position. The second metal layer includes a second metal different from a first metal of the first metal layer.

For example, the battery pack may further include a bolt member configured to penetrate the second metal layer at the external connection position, and a nut member protruding from an insulative support surface. The bolt member may be fastened to the nut member.

For example, the first and second metal layers may overlap each other at the external connection position, the first metal layer may extend around an outer periphery of the nut member, and the second metal layer may be on an upper surface of the nut member.

For example, the first metal layer may include a first hole which is larger than the outer periphery of the nut member, and the nut member may extend through the first hole.

For example, the second metal layer may include a second hole which is smaller than the outer periphery of the nut member, and the second metal layer may be supported on the upper surface of the nut member along a periphery of the second hole.

For example, the first and second holes may be at the external connection position and may have concentric circular shapes having an identical center and different diameters.

For example, the bolt member may be fastened to the nut member through the second hole.

For example, the first metal layer may be between the insulative support surface from which the nut member protrudes and the second metal layer on an upper surface of the nut member.

For example, the first metal layer and a portion of the nut member protruding from the insulative support surface may be adjacent to each other between the insulative support surface and the second metal layer.

For example, the first metal layer may include a first metal and the second metal layer may include a second metal different than the first metal.

For example, the second metal layer may have a mechanical rigidity greater than a mechanical rigidity of the first metal layer.

For example, the first metal may include aluminum, and the second metal may include copper.

For example, the terminal member may further include a conductive bonding layer forming a conductive bond between the first and second metal layers.

For example, the conductive bonding layer may include a solder paste, a conductive film, and/or a conductive adhesive.

For example, the battery pack may also include a first plating layer on a first surface of the first metal layer facing the second metal layer, and a second plating layer on a second surface of the second metal layer facing the first surface of the first metal layer.

For example, the battery pack may also include a third plating layer on the second plating layer.

For example, the first and second plating layers may each include nickel, and the third plating layer may include tin.

For example, in a state in which the bolt member and the nut member are not fastened to each other, the nut member may protrude from the insulative support surface to a first height, and the first metal layer may have a thickness less than the first height and may be spaced apart from the insulative support surface.

For example, a clearance gap may be between the first metal layer and the insulative support surface.

For example, in a state in which the bolt member and the nut member are fastened to each other, the nut member may protrude from the insulative support surface to a second height, and the first metal layer may be in contact with the insulative support surface.

For example, the second height may be lower than the first height.

For example, the second metal layer may be between a head of the bolt member and the nut member, and the first metal layer may be spaced away from a gap between the head of the bolt member and the nut member.

For example, in a state in which the bolt member and the nut member are fastened to each other, the head of the bolt member may have an area covering both the nut member and a portion of the first metal layer around the nut member.

For example, in a state in which the bolt member and the nut member are fastened to each other, the head of the bolt member may press the second metal layer toward the first metal layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

A battery pack will now be described with reference to the accompanying drawings, in which exemplary embodiments are shown.

Figure 1:
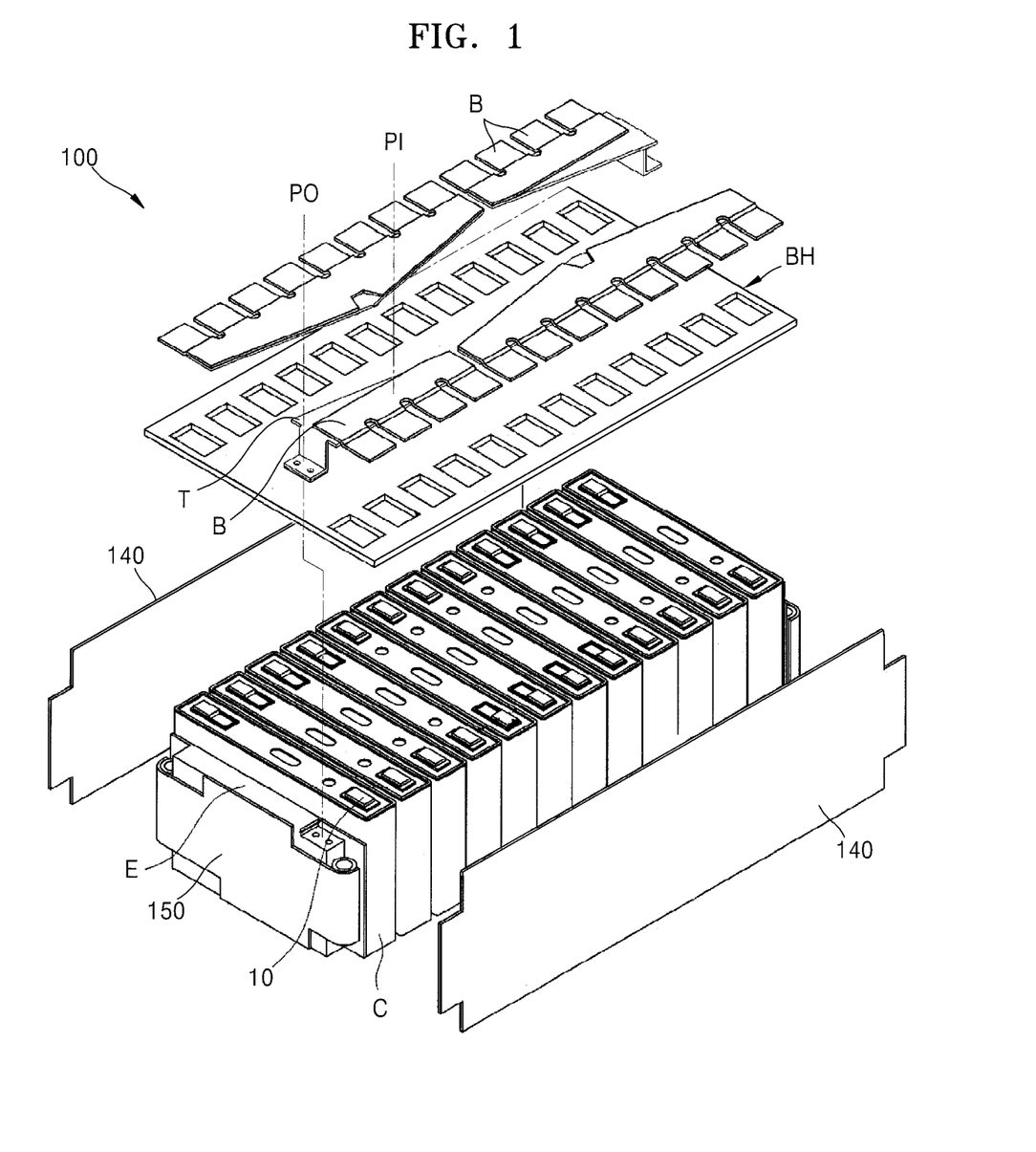
FIG. 1 is an exploded perspective view illustrating a battery pack according to an example embodiment.

FIG. 1 is an exploded perspective view illustrating a battery pack 100 according to an example embodiment.

Referring to FIG. 1, the battery pack 100 of the present disclosure may include a plurality of battery cells C and a plurality of bus bars B electrically connecting the plurality of battery cells C to each other. For example, the battery pack 100 may include a plurality of battery cells C arranged in a first direction. The battery pack 100 may include a pair of end plates 150 placed on both ends of the battery cells C in the first direction, and a pair of side plates 140 placed on lateral sides of the battery cell C in a second direction crossing the first direction. The battery cells C arranged in the first direction may be structurally coupled to each other by the end plates 150 and the side plates 140.

Figure 3:
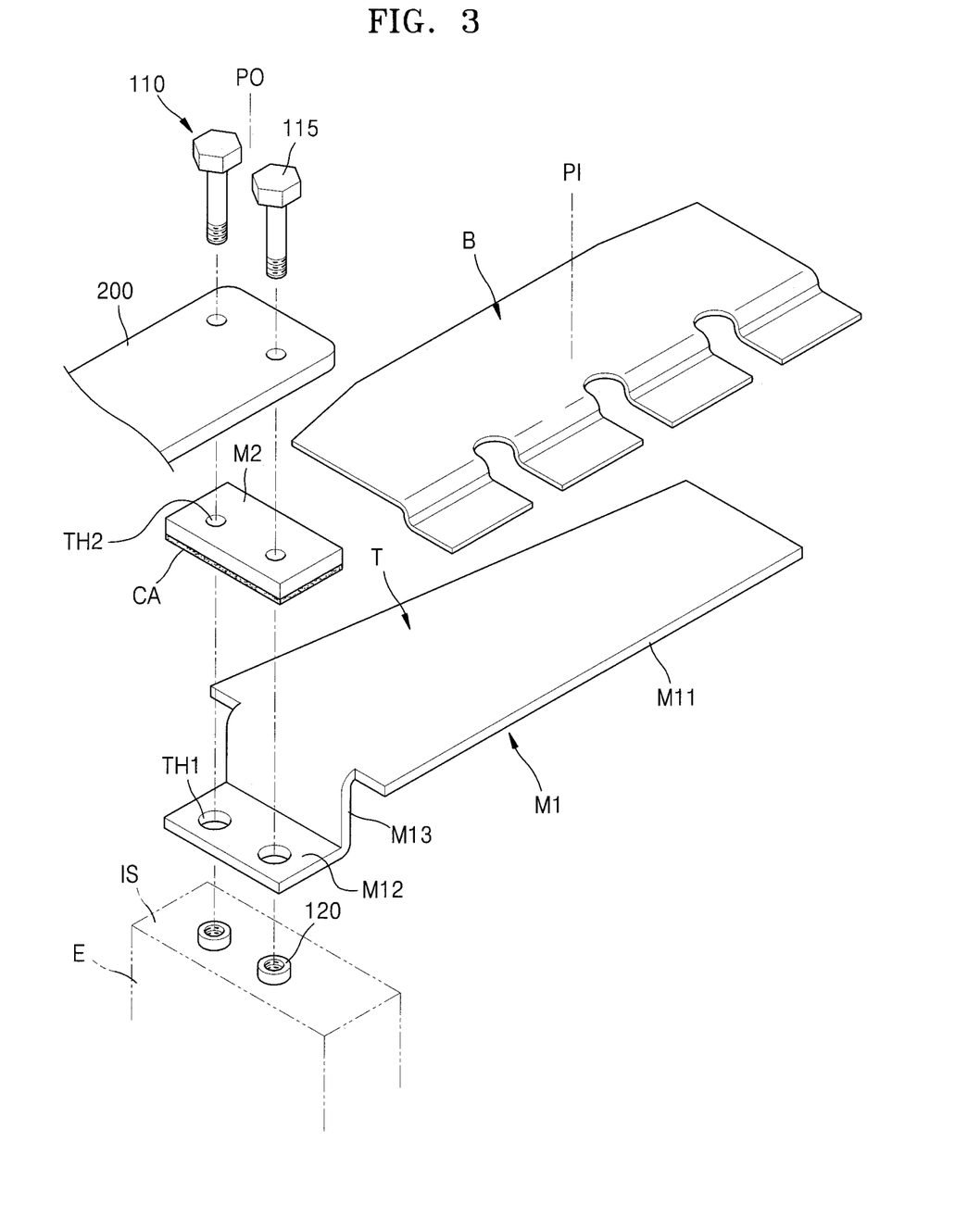
FIGS. 3 and 4 are exploded perspective views illustrating a coupling structure between an external connection member and a terminal member T shown in FIG. 2.

End blocks E may be placed between the battery cells C and the end plates 150 to provide rigidity to securely bind the battery cells C to each other and to provide insulation between the battery cells C and the end plates 150. Referring to FIG. 3, an end block E may provide an insulative support surface IS on which nut members 120 are supported at an external connection position PO for electrically connecting neighboring battery packs 100 to each other, which will be described in more detail below.

The bus bars B are for electrically connecting the battery cells C neighboring each other, and the battery cells C may be connected in series, parallel or series-parallel. For example, the bus bars B may connect the battery cells C in parallel by connecting the same polarity electrodes 10 of the battery cells C to each other, or in series by connecting different polarity electrodes 10 of the battery cells C to each other.

In the battery pack 100 of the example embodiment, every four neighboring battery cells C may be connected in parallel into a parallel block, and neighboring parallel blocks each including the four parallel battery cells C may be connected in series. For example, the battery cells C may be arranged in the first direction, and units (corresponding to the parallel blocks) each including neighboring four battery cells C may be arranged in a left-right-alternating pattern. In this embodiment, the bus bars B may extend in the first direction and may connect battery cells C of the same parallel block in parallel and battery cells C of different parallel blocks in series.

A bus bar holder BH may be placed between the battery cells C and the bus bars B. The bus bar holder BH may provide insulation between the battery cells C and the bus bars B. In a state in which the bus bar holder BH is insulated from the battery cells C, the bus bar holder BH may support the bus bars B at a position above the battery cells C. The bus bar holder BH may allow electrical connection between the electrodes 10 of the battery cells C and the bus bars B through a plurality of openings while blocking electrical interference between the bus bars B and portions of the battery cells C other than the electrodes 10. Although not shown in FIG. 1, a circuit board may be placed on the bus bar holder BH to collect state information about the battery cells C and control charging and discharging operations of the battery cells C based on the collected state information.

Figure 2:
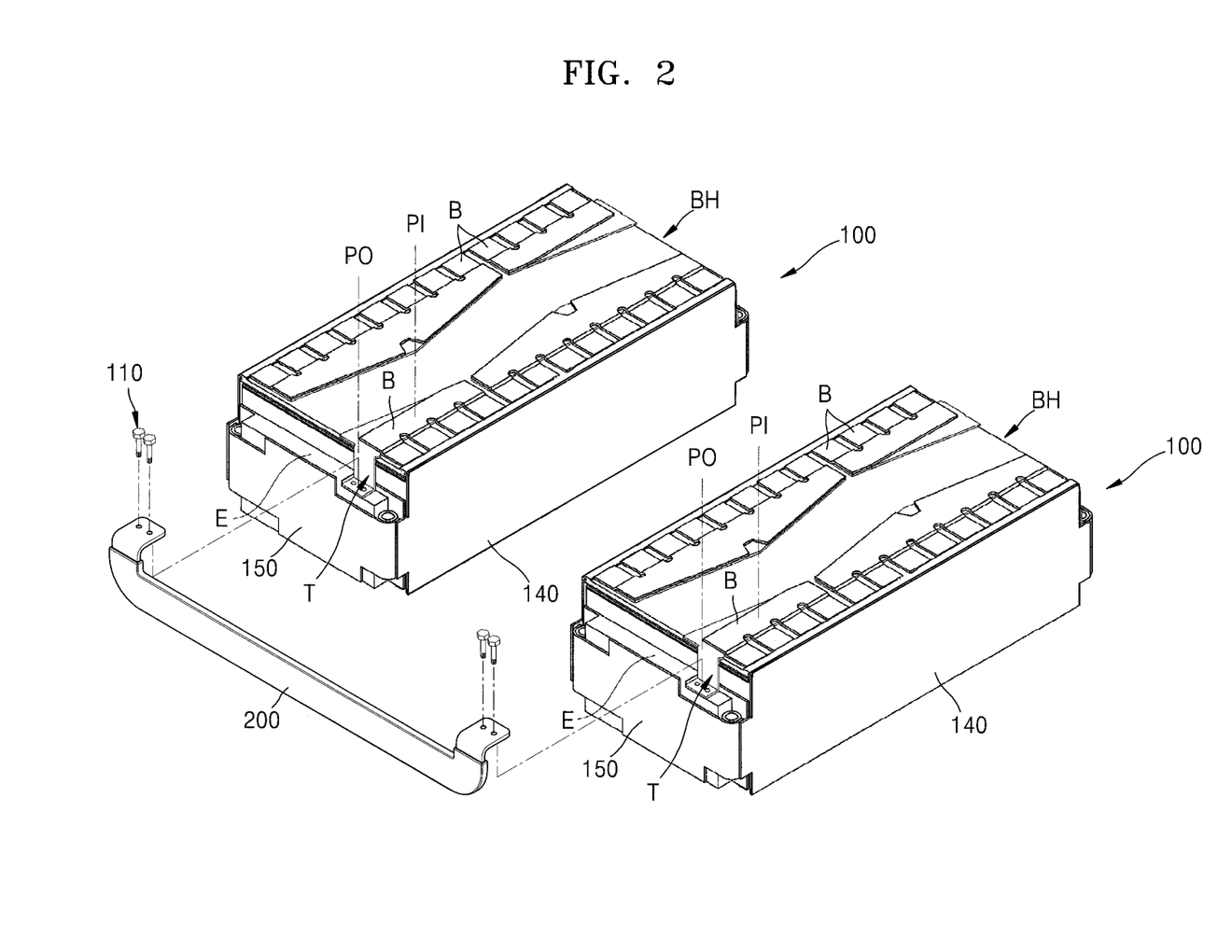
FIG. 2 is a perspective view illustrating a connection structure between the battery pack shown in FIG. 1 and another neighboring battery pack.

FIG. 2 is a perspective view illustrating a connection structure between the battery pack 100 shown in FIG. 1 and another battery pack neighboring the battery pack 100.

Referring to FIG. 2, the battery pack 100 may be electrically connected to a neighboring battery pack 100 to provide high-voltage, high-output power. In this embodiment, the battery packs 100 neighboring each other may be electrically connected to each other through an external connection member 200 which is electrically connected to terminal members T of the battery packs 100 at external connection positions PO of the battery packs 100. As described below, the external connection member 200 may be coupled to the terminal members T at the external connection positions PO by fastening bolt members 110 to end blocks E through the external connection member 200 and the terminal members T. This will be described later.

Figure 4:
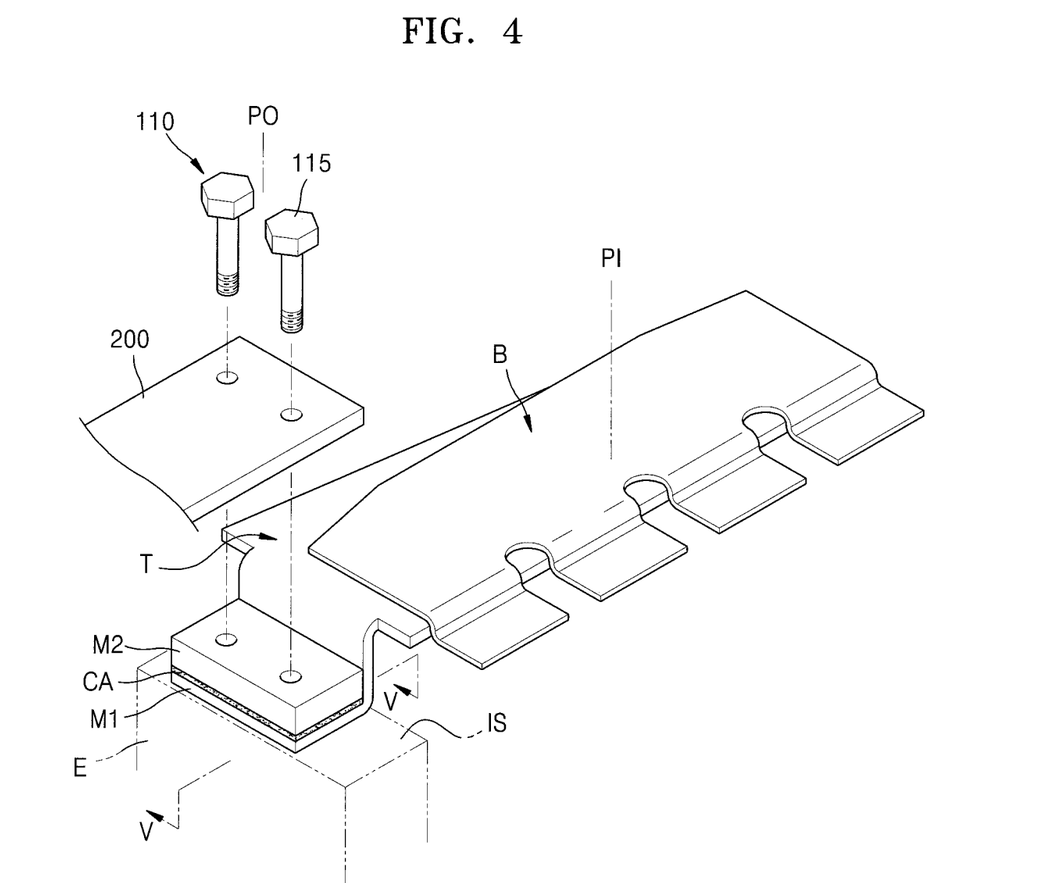
Figure 5:
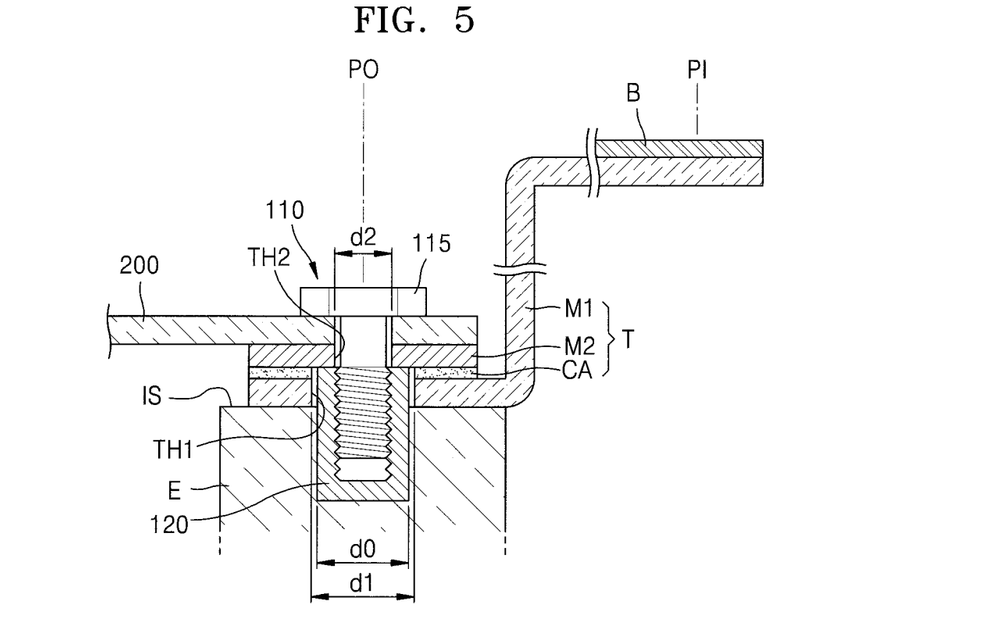
FIG. 5 is a cross-sectional view taken along line V-V of FIG. 4.
Figure 6:
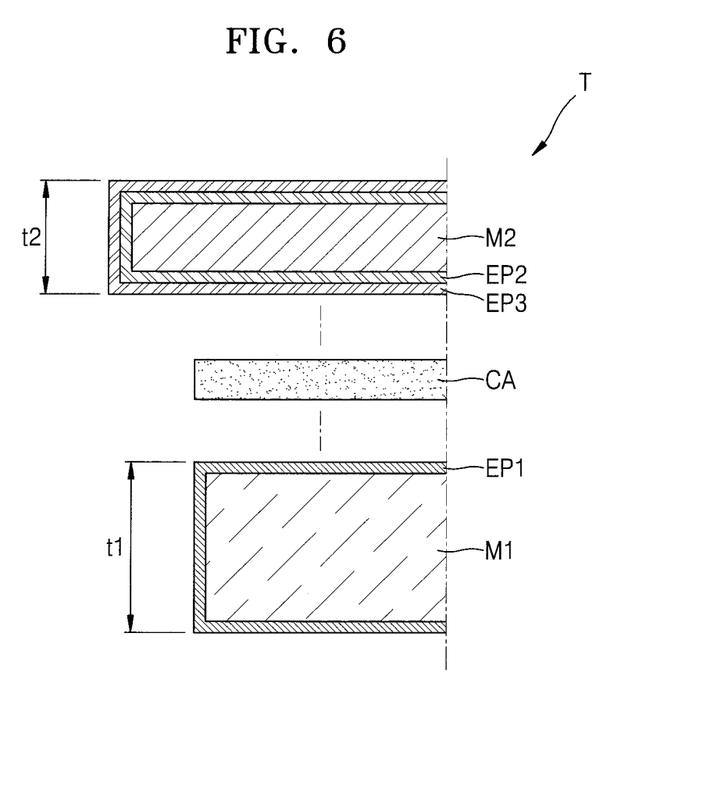
FIG. 6 is an enlarged view illustrating a portion of FIG. 5.

FIGS. 3 and 4 are exploded perspective views illustrating a coupling structure between the external connection member 200 and a terminal member T shown in FIG. 2. FIG. 5 is a cross-sectional view taken along line V-V of FIG. 4. FIG. 6 is an enlarged view illustrating a portion of FIG. 5.

Referring to FIGS. 3 to 6, the battery pack 100 of the present disclosure may have an internal connection position PI connected to at least one of the bus bars B and the terminal member T. The terminal member T may include: a first metal layer M1 extending from the internal connection position PI to the external connection position PO for supplying the output power of the battery pack 100 to an external device; and a second metal layer M2 covering the first layer M1 at the external connection position PO.

The first metal layer M1 may form the entire structure of the terminal member T while extending from the internal connection position PI to the external connection position PO. The internal connection position PI may refer to a position inside the battery pack 100 at which at least one of the bus bars B electrically connecting the battery cells C is connected to the terminal member T. The external connection position PO may refer to a position at which the terminal member T is fastened to supply the output power of the battery pack 100 to an external device. For example, the terminal member T may be connected to the external connection member 200 to electrically connect the battery pack 100 to another neighboring battery pack 100. In this embodiment, a connection position between the terminal member T and the external connection member 200 may correspond to the external connection position PO. As described below, the terminal member T and the external connection member 200 may be coupled by fastening bolt members 110 to nut members 120, and a position at which the bolt members 110 and the nut members 120 are fastened to each other may correspond to the external connection position PO. In one embodiment, the external connection position PO may correspond to the position at which the terminal member T is fastened to the end block E.

The first metal layer M1 may extend from the internal connection position PI connected to the bus bar B to the external connection position PO connected to the external connection member 200. For example, the first metal layer M1 may include a first portion M11 at the internal connection position PI, a second portion M12 at the external connection position PO, and a connection portion M13 covering a height difference between the first and second portions M11 and M12 by connecting the first portion M11 located at a relatively high level (the internal connection position PI) to the second portion M12 located at a relative low level (the external connection position PO). For example, the first metal layer M1 may be provided in a stepped plate shape as a whole. The connection portion M13 may extend to bridge the height difference between the internal connection position PI (the first portion M11) and the external connection position PO (the second portion M12).

The first metal layer M1 may be directly connected to the bus bar B at the internal connection position PI and may be indirectly connected to the external connection member 200 through the second metal layer M2 at the external connection position PO. For example, the first metal layer M1 and the bus bar B may include the same first metal to form a strong bond between parts including the same metal, that is, between the first metal layer M1 and the bus bar B. For example, the first metal layer M1 and the bus bar B may both include aluminum or an aluminum alloy. The first metal layer M1 and the bus bar B may be welded to each other. For example, the first metal layer M1 and the bus bar B may be welded to each other by an ultrasonic welding process in which the first metal layer M1 and the bus bar B are superposed on each other (e.g., stacked on each other), pressed against each other, and vibrated at a ultrasonic frequency.

The second metal layer M2 may be placed above a portion of the first metal layer M1. For example, the second metal layer M2 may be placed above the first metal layer M1 (for example, above the second portion M12 of the first metal layer M1) at the external connection position PO. The second metal layer M2 may be in direct contact with the external connection member 200 and may be electrically connected to each other. The external connection member 200 may electrically connect the battery pack 100 to another battery pack 100 to provide high-capacity, high-output power. That is, the external connection member 200 may be used to connect different battery packs 100 together.

For example, the second metal layer M2 and the external connection member 200 may include the same second metal to form a strong bond between parts including the same metal, that is, between the second metal layer M2 and the external connection member 200. For example, the second metal layer M2 and the external connection member 200 may both include copper or a copper alloy. The external connection member 200 may include a material having high conductivity and structural rigidity such as copper or a copper alloy such that when the external connection member 200 is placed between the bolt members 110 and the nut members 120 and they are fastened to each other, the external connection member 200 may maintain its shape and current-carrying area without deformation even under high clamping pressure between the bolt members 110 and the nut members 120. This is configured to prevent safety accidents such as heating or fires caused by Joule heating which might occur if the current-carrying area of the external connection member 200 was reduced due to high clamping pressure between the bolt members 110 and the nut members 120. In this embodiment, the second metal layer M2, which is in direct contact with the external connection member 200, may also include copper or a copper alloy to form a strong bond between parts including the same material, that is, between the external connection member 200 and the second metal layer M2. The outer connection member 200 and the second metal layer M2 may be in surface contact with each other under high clamping pressure between the bolt members 110 and the nut members 120.

The second metal layer M2 may have a higher mechanical rigidity than the first metal layer M1 and may stably maintain its shape for a long period of time even under high clamping pressure between the bolt members 110 and the nut members 120. Thus, the second metal layer M2 may maintain a sufficient current-carrying area and tight contact with the external connection member 200 without shape deformation that would cause variations in the contact resistance with the external connection member 200. The external connection member 200 and the second metal layer M2 may be in tight contact with each other under high clamping pressure between the bolt members 110 and nut members 120 such that the contact resistance between the external connection member 200 and the second metal layer M2 may be low.

The terminal member T may have a multi-metal structure in which the first and second metal layers M1 and M2 are integrally coupled to each other. In this embodiment, the terminal member T may include the second metal layer M2 having relatively high rigidity for tight coupling with the external connection member 200 under high tightening pressure, and the external connection member 200 and the second metal layer M2 may include the same second metal such that the contact resistance between the external connection member 200 and the second metal layer M2 may be reduced owing to high affinity between the external connection member 200 and the second metal layer M2 including the same second metal. The second metal layer M2 directly connected to the external connection member 200 may electrically connect the external connection member 200 to the first metal layer M1 through conductive coupling (conductive bonding layer CA) with the first metal layer M1. The first metal layer M1 and the bus bar B may include the same first metal to form a secure bond between the first metal layer M1 and the bus bar B including the same second metal.

The terminal member T may server as a medium for electrical connection between the external connection position PO and the internal connection position PI. To this end, the first and second metal layers M1 and M2 of the terminal member T may be in direct contact with connection counterparts (the bus bar B and the external connection member 200, respectively) at the internal connection position PI and the external connection position PO, and the electrical connection between the external connection position PO and the internal connection position PI may be made through conductive connection (the conductive bonding layer CA) between the first and second metal layers M1 and M2. The first and second metal layers M1 and M2 may be placed overlapping each other at the external connection position PO and may be electrically connected to each other through the conductive bonding layer CA that forms a conductive bond between the first and second metal layers M1 and M2 such that the first and second metal layers M1 and M2 may be formed as integral parts structurally coupled to each other.

The first and second metal layers M1 and M2 may include the first and second metals that are different from each other. For example, the first and second metal layers M1 and M2 may be in direct contact with the connection counterparts (the bus bar B and the external connection member 200, respectively) at the internal connection position PI and the external connection position PO to form electrical connection with the connection counterparts and may include the same metals as the connection counterparts to form secure coupling with the connection counterparts. To this end, like the bus bar B, the first metal layer M1 may include the first metal such as aluminum or an aluminum alloy, and like the external connection member 200, the second metal layer M2 may include the second metal such as copper or a copper alloy.

The external connection member 200 is for electrically connecting neighboring battery packs 100 to form a path for high-output, high-capacity power of the battery packs 100 and may thus include copper or a copper alloy having high mechanical rigidity as well as high electrical conductivity. The external connection member 200 may have high mechanical rigidity to withstand high clamping pressure between the bolt members 110 and the nut members 120 at the external connection position PO and maintain its external shape despite the high clamping pressure to prevent deformation in which the current-carrying area of the external connection member 200 is reduced. If the external connection member 200 were deformed and reduced in its current-carrying area due to high clamping pressure, the electrical output power of the battery pack 100 may be lowered, and safety accidents such as fires may occur due to Joule heating.

Referring to FIG. 5, a bolt member 110 and a nut member 120 are used to couple the terminal member T and the external connection member 200 to each other at the external connection position PO by high clamping pressure. Among the first and second metal layers M1 and M2 overlapping each other at the external connection position PO, the second metal layer M2 having relatively high rigidity is coupled to the external connection member 200 by high clamping pressure such that the first metal layer M1 having relatively low rigidity may be protected and electrical connection between the external connection position PO and the internal connection position PI may be smoothly made through a conductive coupling (conductive bonding layer CA) between the first and second metal layers M1 and M2.

The second metal layer M2 may be placed between the bolt member 110 (a head 115 of the bolt member 110) and the nut member 120 and may be coupled to the external connection member 200 by high clamping pressure between the bolt member 110 (the head 115 of the bolt member 110) and the nut member 120. The second metal layer M2 brought into tight contact with the external connection member 200 by the clamping pressure between the bolt member 110 and the nut member 120 may be electrically connected to the bus bar B at the internal connection position PI through the first metal layer M1 which is conductively coupled to the second metal layer M2 (through the conductive bonding layer CA).

The bolt member 110 and the nut member 120 may be coupled to each other by high clamping pressure to reduce contact resistance between the external connection member 200 and the second metal layer M2 that are placed between the bolt member 110 (the head 115 of the bolt member 110) and the nut member 120. The external connection member 200 and the second metal layer M2 may include the second metal having high rigidity such that deformation of the external connection member 200 and the second metal layer M2 and resultant variations in the current-carrying areas of the external connection member 200 and the second metal layer M2 may be may be suppressed even under high clamping pressure.

At the external connection position PO, the first and second metal layers M1 and M2 are arranged to overlap each other and are electrically connected and structurally integrated with each other through the conductive bonding layer CA placed therebetween. The second metal layer M2 having relatively high rigidity is subjected to high clamping pressure between the bolt member 110 (the head 115 of the bolt member 110) and the nut member 120, but the first metal layer M1 having relatively low rigidity is spaced away from the bolt member 110 and the nut member 120 and is thus not directly subjected to clamping pressure. As described below, the first metal layer M1 is fitted around the outer periphery of the nut member 120 so as not to be in the region of the nut member 120 such that the first metal layer M1 may not be subjected to clamping pressure between the bolt member 110 (the head 115 of the bolt member 110) and the nut member 120. However, the second metal layer M2 is placed on an upper surface of the nut member 120 and is thus directly subjected to clamping pressure of the bolt member 110 (the head 115 of the bolt member 110) coupled to the nut member 120 such that the second metal layer M2 and the external connection member 200 may be brought into tight contact with each other by the high clamping pressure.

The first and second metal layers M1 and M2 are superimposed (e.g., stacked) on each other at the external connection position PO in a state in which the first metal layer M1 is fitted around the outer periphery of the nut member 120 and the second metal layer M2 is placed on the upper surface of the nut member 120. That is, the first metal layer M1 includes a first hole TH1 which is larger than the outer periphery of the nut member 120. For example, the diameter d1 of the first hole TH1 may be greater than the outer diameter d0 of the nut member 120. In addition, the first metal layer M1 may be fitted around the outer periphery of the nut member 120 using the first hole TH1 (e.g., the diameter d1 of the first hole TH1 in the first metal layer M1 configured to accommodate the nut member 120 is larger than an outer diameter d0 of the nut member 120). The second metal layer M2 includes a second hole TH2 which is smaller than the outer periphery of the nut member 120. For example, the diameter d2 of the second hole TH2 may be less than the outer diameter d0 of the nut member 120. In addition, the second metal layer M2 may be supported on the upper surface of the nut member 120 along the periphery of the second hole TH2.

The first and second holes TH1 and TH2 of the first and second metal layers M1 and M2, respectively, may be formed at positions corresponding to each other, that is, at the external connection position PO, and may have different sizes (for example, the different diameters d1 and d2). For example, the first and second holes TH1 and TH2 may be concentrically formed around the same center with the different diameters d1 and d2. In this embodiment, the diameter d1 of the first hole TH1 may be greater than the outer diameter d0 of the nut member 120, and the diameter d2 of the second hole TH2 may be less than the diameter d2 of the nut member 120. Owing to the first and second holes TH1 and TH2 having different sizes and formed at the external connection position PO of the first and second metal layers M1 and M2, the first metal layer M1 may be fitted around the nut member 120 and may not be affected by clamping pressure of the bolt member 110 fastened to the nut member 120, and the second metal layer M2 may be placed on the upper surface of the nut member 120 and may be brought into tight contact with the external connection member 200 and securely coupled to the external connection member 200 by clamping pressure of the bolt member 110 fastened to the bolt member 110.

The nut member 120 may protrude from an insulative support surface IS. In one embodiment, the insulative support surface IS may refer to the upper surface of the end block E that supports the nut member 120. In the present disclosure, however, the insulative support surface IS is not limited to the upper surface of the end block E, and, instead, any support base for fixing the position of the nut member 120 may be considered in a broad sense as the insulative support surface IS.

For example, the nut member 120 may be embedded in the end block E. For example, the nut member 120 may be formed together with the end block E. For example, the nut member 120 may be formed integrally with the end block E by an insert molding method. The expression "the nut member 120 is embedded in the end block E" does not mean that the nut member 120 is entirely embedded in the end block E. Instead, the nut member 120 may protrude from the upper surface of the end block E for coupling with the bolt member 110 (e.g., the nut member 120 may be only partially embedded in the end block E).

The first metal layer M1 may be fitted around the outer periphery of the nut member 120 and may be placed outside the nut member 120. In this embodiment, the first metal layer M1 may be placed between the insulative support surface IS from which the nut member 120 protrudes and the second metal layer M2, which is on (e.g., fixed to) the upper surface of the nut member 120. For example, the first metal layer M1 may be placed between the insulative support surface IS and the second metal layer M2 in a state in which lower and upper surfaces of the first metal layer M1 are respectively in contact with the insulative support surface IS and the second metal layer M2 (or the conductive bonding layer CA). The nut member 120 (for example, a portion of the nut member 120 protruding from the insulative support surface IS) and the first metal layer M1 provided around the nut member 120 may neighbor each other between the insulative support surface IS (from which the nut member 120 protrudes) and the second metal layer M2 (which is fixed to the upper surface of the nut member 120).

Referring to FIG. 6, the terminal member T may include the conductive bonding layer CA between the first and second metal layers M1 and M2. The conductive bonding layer CA is placed between the first and second metal layers M1 and M2 to integrally bond the first and second metal layers M1 and M2 to each other. Therefore, the first and second metal layers M1 and M2 may be electrically connected to each other while being structurally coupled to each other. For example, the conductive bonding layer CA may include at least one of solder paste, a conductive film, and a conductive adhesive. For example, the conductive bonding layer CA may be formed according to a heat lamination method by placing a material such as solder paste, a conductive film, and/or a conductive adhesive between the first and second metal layers M1 and M2 and applying high pressure and heat thereto to integrally bond the first and second metal layers M1 and M2 together.

The first and second metal layers M1 and M2 may include the first and second metals that are different from each other, and at least one plating layer may be formed on each of the mutually-facing surfaces of the first and second metal layers M1 and M2 to form a strong conductive bond between the first and second metal layers M1 and M2. For example, first and second plating layers EP1 and EP2 may be formed on the mutually-facing surfaces of the first and second metal layers M1 and M2, respectively.

For example, the first plating layer EP1 may be formed on the surface of the first metal layer M1 facing the second metal layer M2, and the second plating layer EP2 may be formed on the surface of the second metal layer M2 facing the first metal layer M1. The first and second plating layers EP1 and EP2 may be respectively formed on the mutually-facing surfaces of the first and second metal layers M1 and M2, respectively, to prevent deterioration of bonding between the first and second metal layers M1 and M2 caused by detrimental substances such as oxides formed on the mutually-facing surfaces of the first and second metal layers M1 and M2. For example, the first plating layer EP1 may block the formation of detrimental substances between the first metal layer M1 and the conductive bonding layer CA, thereby preventing deterioration of bonding properties between the first metal layer M1 and the conductive bonding layer CA and oxidation and corrosion of the first metal layer M1. Similarly, the second plating layer EP2 may block the formation of detrimental substances between the second metal layer M2 and the conductive bonding layer CA, thereby preventing deterioration of bonding properties between the second metal layer M2 and the conductive bonding layer CA and oxidation and corrosion of the second metal layer M2. For example, nickel plating layers containing nickel may be formed as the first and second plating layers EP1 and EP2.

A third plating layer EP3 may be further formed on the second plating layer EP2 for the second metal layer M2. That is, the second plating layer EP2 and the third plating layer EP3 may be sequentially formed on the second metal layer M2. Defects such as whiskers may be prevented by forming the second plating layer EP2 as a base plating layer and further forming the third plating layer EP3 on the base plating layer. The formation of whiskers that are acicular crystals may increase electrical resistance and lower conduction properties, and when the formation of whiskers are not controlled, it is difficult to guarantee uniform quality and prevent process-dependent large deviations in electrical resistance. Thus, the second plating layer EP2 may be formed as a base plating layer, and the third plating layer EP3 may be further formed on the second plating layer EP2 to prevent the formation of defects such as whiskers. The second plating layer EP2 may be a nickel plating layer containing nickel, and the third plating layer EP3 may be a tin plating layer containing tin.

Since the second metal layer M2 may include copper which is vulnerable to whiskers, a nickel plating layer and a tin plating layer may be sequentially formed on the second metal layer M2 as the second plating layer EP2 and the third plating layer EP3. Since the first metal layer M1 may include aluminum, the first plating layer EP1 may be formed on the first metal layer M1 for preventing corrosion and oxidation, and an additional plating layer for preventing whiskers may not be formed.

Table 1 below shows results of measurement of the electrical resistance between the first and second metal layers M1 and M2 which was varied according to different plating structures formed on the first and second metal layers M1 and M2. In Table 1, Examples 1 to 3 have the following structures.

Example 1 has a structure in which the first plating layer EP1 is not formed on the first metal layer M1, and the second and third plating layers EP2 and EP3 are sequentially formed on the second metal layer M2.

Example 2 has a structure in which the first plating layer EP1 is formed on the first metal layer M1, and the second and third plating layers EP2 and EP3 are sequentially formed on the second metal layer M2.

Example 3 has a structure in which the first plating layer EP1 is formed on the first metal layer M1, and only the second plating layer EP2 is formed on the second metal layer M2.

In the measurement of electrical resistance, the electrical resistance between the first and second metal layers M1 and M2 was measured five times in each of Examples 1 to 3.

It may be seen from Table 1 that Example 2 in which the first to third plating layers EP1, EP2 and EP3 are formed has the lowest electrical resistance on average. Example 1 in which the first plating layer EP1 is not formed has the greatest electrical resistance on average. Although Example 3 in which the third plating layer EP3 is not formed has lower electrical resistance than Example 1, the electrical resistance of Example 3 is not uniform and varies greatly, and it is understood that these large deviations in electrical resistance for Example 3 occur due to the formation of whisker defects.

TABLE 1

| Electrical Resistance (mΩ) | Example 1 | Example 2 | Example 3 |
|---|---|---|---|
| First | 0.481 | 0.057 | 0.023 |
| Second | 3.484 | 0.032 | 0.273 |
| Third | 6.050 | 0.039 | 0.604 |
| Fourth | 2.620 | 0.061 | 1.643 |
| Fifth | 19.430 | 0.083 | 0.052 |

Referring to FIG. 6, according to an embodiment, the thickness t1 of the first metal layer M1 on which the first plating layer EP1 is formed may be relatively large, and the thickness t2 of the second metal layer M2 on which the second and third plating layers EP2 and EP3 are formed may be relatively small.

For example, the second metal layer M2 may have rigidity greater than the rigidity of the first metal layer M1 such that the second metal layer M2 may form a secure coupling with the external connection member 200 at the external connection position PO by high clamping pressure between the bolt member 110 and the nut member 120, and the first metal layer M1 may be thicker than the second metal layer M2 to form a charging-discharging current path. That is, the second metal layer M2 may have a small thickness as long as the second metal layer M2 forms a secure bond with the external connection member 200 without excessive deformation under high clamping pressure, and the first metal layer M1 may be thicker than the second metal layer M2 to connect the internal connection position PI and the external connection position PO to each other while substantially forming a charging-discharging path of the terminal member T.

Figure 7:
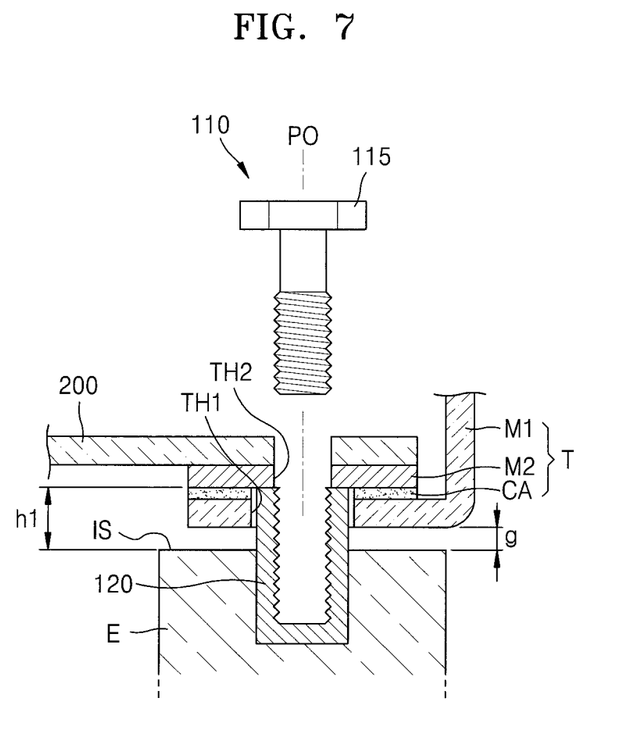
FIG. 7 is a view illustrating a state in which a bolt member is not fastened to a nut member, and the nut member is not compressed.
Figure 8:
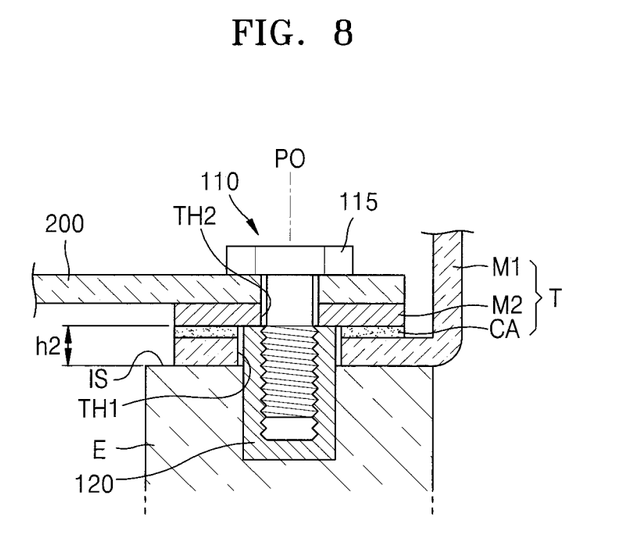
FIG. 8 is a view illustrating a state in which the bolt member is fastened to the nut member, and thus the nut member is compressed.

FIG. 7 illustrates a state in which the bolt member 110 is not fastened to the nut member 120, and the nut member 120 is not compressed. FIG. 8 illustrates a state in which the bolt member 110 is fastened to the nut member 120, and thus the nut member 120 is compressed.

In the non-compressed state shown in FIG. 7, the nut member 120 may protrude from the insulative support surface IS to a relatively high first height h1, and the first metal layer M1 coupled to the second metal layer M2 supported on the upper surface of the nut member 120 may be spaced apart from the insulative support surface IS. For example, the thickness t1 of the first metal layer M1 may be less than the first height h1 and may thus be spaced apart from the insulative support surface IS when the nut member 120 is in the non-compressed state.

The first metal layer M1 may be spaced apart from the insulative support surface IS by a clearance gap g, and owing to the clearance gap g, the first metal layer M1 may approach the insulative support surface IS together with the second metal layer M2 fixed to the upper surface of the nut member 120 as the bolt member 110 is fastened to the nut member 120 and the nut member 120 is compressed. During fastening of the bolt member 110 to the nut member 120, although the clearance gap g reduces, the first metal layer M1 having relatively low rigidity may not be compressed until the clearance gap g disappears.

In the compressed state shown in FIG. 8, the nut member 120 may protrude from the insulative support surface IS to a relatively low second height h2 because the nut member 120 is compressed from the first height h1 of the non-compressed state to the second height h2 by the coupling pressure of the bolt member 110. As the nut member 120 is compressed, the first metal layer M1 may approach the insulative support surface IS together with the second metal layer M2 fixed to the upper surface of the nut member 120, and thus the clearance gap g between the first metal layer M1 and the insulative support surface IS may reduce according to the compression of the nut member 120. Then, as the compression of the nut member 120 proceeds further, the clearance gap g between the first metal layer M1 and the insulative support surface IS disappears, and the first metal layer M1 may be brought into contact with the insulative support surface IS and tightly placed between the second metal layer M2 and the insulative support surface IS. In one or more embodiments, as the nut member 120 is compressed during fastening of the bolt member 110 to the nut member 120, the nut member 120 may move within the end block E (e.g., the nut member 120 may slide further into the end block E) such that the exposed portion of the nut member 120 projecting from the insulative support surface IS is reduced from the first height h1 to the second height h2. In one or more embodiments, the portion of the nut member 120 embedded in the end block E below the insulative support surface IS may not move as the nut member 120 is compressed during fastening of the bolt member 110 to the nut member 120 (e.g., in one or more embodiments, the embedded portion of the nut member 120 below the insulative support surface IS may not compress or expand, or otherwise move within the end block E, due to the constraint of the rigid end block E, even under pressure from the head 115 of the bolt member 110). Instead, in one or more embodiments, the exposed portion of the nut member 120 (e.g., the portion of the nut member 120 protruding from the insulative support surface IS) may be compressed along the length direction of the nut member 120 and may expand along a widthwise direction of the nut member 120 due to the pressure applied from the bolt member 110 such that the exposed portion of the nut member 120 is reduced from the first height h1 to the second height h2 (e.g., during the fastening of the bolt member 110 to the nut member 120, the exposed portion of the nut member 120 may expand in its widthwise direction according to the compression of the nut member 120 along its lengthwise direction, thereby reducing the height of the exposed portion of the nut member 120 from the first height h1 to the second height h2).

As the nut member 120 is compressed, the first metal layer M1 approaches the insulative support surface IS together with the second metal layer M2 fixed to the upper surface of the nut member 120, and the first metal layer M1 makes contact with the insulative support surface IS. Then, the nut member 120 and the first metal layer M1 deform together, and thus, the height of the nut member 120 protruding from the insulative support surface IS and the thickness t1 of the first metal layer M1 may be maintained to be equal to each other. That is, at the moment when the first metal layer M1 touches the insulative support surface IS as the nut member 120 is compressed, the clearance gap g may disappear, and compression deformation of the second metal layer M1 may begin to occur.

The clearance gap g between the first metal layer M1 and the insulative support surface IS when the nut member 120 is in the non-compressed state may be determined by considering the desired amount of compression of the first metal layer M1. When the clearance gap g is set to be too small, the first metal layer M1 having relatively low rigidity may undergo compression deformation which exceeds the elastic limit of the first metal layer M1 after the clearance gap g disappears. The clearance gap g between the first metal layer M1 and the insulative support surface IS when the nut member 120 is in the non-compressed state may be set such that the first metal layer M1 may deform within its elastic limit. If the first metal layer M1 were plastically deformed beyond its elastic limit, the current-carrying area of the first metal layer M1 may be reduced due to excessive compression deformation, and thus safety accidents may occur due to Joule heating or the like. In addition, the clamping pressure between the bolt member 110 and the nut member 120 may be affected by time-dependent deformation, and as the clamping pressure between the bolt member 110 and the nut member 120 decreases with time, the contact between the external connection member 200 and the second metal layer M2 that are required to be in tight contact with each other by high pressure may weaken and become poor, thereby increasing the contact resistance between the external connection member 200 and the second metal layer M2 and the electrical resistance of the entire charging-discharging path, which causes a decrease in electrical output power performance.

The head 115 of the bolt member 110 may have a relatively large area covering at least a portion of the second metal layer M2 such that when the bolt member 110 is fastened to the nut member 120, the head 115 may press the second metal layer M2 placed on the nut member 120. The second metal layer M2 may be maintained in tight contact with the external connection member 200 by high clamping pressure between the head 115 of the bolt member 110 and the nut member 120. In addition, the head 115 of the bolt member 110 may have a relatively large area such that the head 115 may overlap the first metal layer M1 placed along the outer periphery of the nut member 120. Owing to this, the head 115 of the bolt member 110 may press the first metal layer M1 to some degree, thereby securely fixing the first metal layer M1 between the second metal layer M2 and the insulative support surface IS and stably maintaining the coupling between the bolt member 110 and the nut member 120 to prevent a time-dependent decrease in coupling pressure caused by unstable supporting states. For example, the head 115 of the bolt member 110 may have a large area to cover the nut member 120 and a portion of the first metal layer M1 placed outside (around) the nut member 120.

The expression "the head 115 of the bolt member 110 presses the first metal layer M1" may mean that the head 115 of the bolt member 110 presses the first metal layer M1 through the second metal layer M2 or the head 115 of the bolt member 110 presses the second metal layer M2 toward the first metal layer M1. That is, according to the clamping force of the bolt member 110 fastened to the nut member 120, the second metal layer M2 may press the first metal layer M1 toward the insulative support surface IS, and thus the first metal layer M1 may be tightly placed and securely fixed between the second metal layer M2 and the insulative support surface IS.

As described above, according to the one or more of the above-described embodiments, in the battery pack including a plurality of battery cells, a multi-metal structure is applied to a conductive member serving as a medium for electrical connection between an internal connection position electrically connected to the battery cells and an external connection position for supplying the output power of the battery pack to an external device, and thus the conductive member may create a stable electrical connection having low electrical resistance.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A battery pack comprising:
a plurality of battery cells;
a plurality of bus bars electrically connecting the plurality of battery cells; and
a terminal member,
wherein the terminal member comprises:
a first metal layer extending from an internal connection position connected to at least one of the plurality of bus bars to an external connection position for supplying output power of the battery pack, the external connection position being outside of and extending beyond the plurality of battery cells; and a second metal layer covering the first metal layer at the external connection position, the second metal layer comprising a second metal different from a first metal of the first metal layer.

2. The battery pack of claim 1, further comprising:
a bolt member configured to penetrate the second metal layer at the external connection position; and
a nut member protruding from an insulative support surface, wherein the bolt member is configured to be fastened to the nut member.

3. The battery pack of claim 2, wherein:
the first and second metal layers overlap each other at the external connection position,
the first metal layer extends around an outer periphery of the nut member, and
the second metal layer is on an upper surface of the nut member.

4. The battery pack of claim 3, wherein the first metal layer includes a first hole which is larger than the outer periphery of the nut member, and wherein the nut member extends through the first hole.

5. The battery pack of claim 4, wherein the second metal layer includes a second hole which is smaller than the outer periphery of the nut member, and wherein the second metal layer is supported on the upper surface of the nut member along a periphery of the second hole.

6. The battery pack of claim 5, wherein the first and second holes are at the external connection position, and wherein the first and second holes have concentric circular shapes having an identical center and different diameters.

7. The battery pack of claim 5, wherein the bolt member is fastened to the nut member through the second hole.

8. The battery pack of claim 2,
wherein the first metal layer is between the insulative support surface from which the nut member protrudes and the second metal layer on an upper surface of the nut member.

9. The battery pack of claim 8, wherein the first metal layer and a portion of the nut member protruding from the insulative support surface are adjacent to each other between the insulative support surface and the second metal layer.

10. The battery pack of claim 1, wherein the first metal layer comprises a first metal and the second metal layer comprises a second metal different than the first metal.

11. The battery pack of claim 10, wherein the second metal layer has a mechanical rigidity greater than a mechanical rigidity of the first metal layer.

12. The battery pack of claim 11, wherein the first metal comprises aluminum, and the second metal comprises copper.

13. The battery pack of claim 1, wherein the terminal member further comprises a conductive bonding layer forming a conductive bond between the first and second metal layers.

14. The battery pack of claim 13, wherein the conductive bonding layer comprises at least one of solder paste, a conductive film, or a conductive adhesive.

15. The battery pack of claim 1, further comprising a first plating layer on a first surface of the first metal layer facing the second metal layer, and a second plating layer on a second surface of the second metal layer facing the first surface of the first metal layer.

16. The battery pack of claim 15, further comprising a third plating layer on the second plating layer.

17. The battery pack of claim 16, wherein the first and second plating layers each comprise nickel, and the third plating layer comprises tin.

18. The battery pack of claim 2,
wherein, in a state in which the bolt member and the nut member are not fastened to each other, the nut member protrudes from the insulative support surface to a first height, and the first metal layer has a thickness less than the first height and is spaced apart from the insulative support surface.

19. The battery pack of claim 18, wherein a clearance gap is between the first metal layer and the insulative support surface.

20. The battery pack of claim 18, wherein, in a state in which the bolt member and the nut member are fastened to each other, the nut member protrudes from the insulative support surface to a second height, and the first metal layer is in contact with the insulative support surface.

21. The battery pack of claim 20, wherein the second height is lower than the first height.

22. The battery pack of claim 2,
wherein the second metal layer is between a head of the bolt member and the nut member, and wherein the first metal layer is spaced away from a gap between the head of the bolt member and the nut member.

23. The battery pack of claim 22, wherein, in a state in which the bolt member and the nut member are fastened to each other, the head of the bolt member has an area covering both the nut member and a portion of the first metal layer around the nut member.

* * * * *